United States Patent [19]

Gittleman

[11] 4,417,755

[45] Nov. 29, 1983

[54] PIPE COUPLING

[75] Inventor: Morris Gittleman, Los Angeles, Calif.

[73] Assignee: Familian Corp., Van Nuys, Calif.

[21] Appl. No.: 308,360

[22] Filed: Oct. 5, 1981

Related U.S. Application Data

[63] Continuation of Ser. No. 512,958, Oct. 7, 1974.

[51] Int. Cl.³ .............................................. F16L 17/04
[52] U.S. Cl. .................... 285/373; 285/367; 285/423
[58] Field of Search ............... 285/373, 423, 419, 367, 285/410, 383, 236; 24/279

[56] References Cited

U.S. PATENT DOCUMENTS

| | | | |
|---|---|---|---|
| 715,222 | 12/1902 | Werth | 285/419 |
| 2,439,979 | 4/1948 | Krooss | 285/423 X |
| 2,721,582 | 10/1955 | Hoke | 285/419 X |
| 2,936,186 | 5/1960 | Dunmire | 285/373 |
| 3,006,663 | 10/1961 | Bowne | 285/373 X |
| 3,084,959 | 4/1963 | Stanton | 285/373 X |
| 3,329,446 | 7/1967 | Katis et al. | 285/373 X |
| 3,341,232 | 9/1967 | Deakins | 285/373 |
| 3,454,287 | 7/1969 | Thiessen | 285/423 X |
| 3,479,066 | 11/1969 | Gittleman | 285/373 X |
| 3,695,638 | 10/1972 | Blakeley | 285/423 X |

FOREIGN PATENT DOCUMENTS 1344457  1/1974  United Kingdom ................ 285/423

Primary Examiner—Dave W. Arola
Attorney, Agent, or Firm—Herzig & Walsh, Inc.

[57] ABSTRACT

The invention is a pipe coupling particularly adapted for coupling together the ends of pipes that may or may not have annular end ribs, i.e. spigot beads. The coupling embodies a gasket into which the ends of the pipes are fitted. Deformable (semi-rigid) clamping members clamp around the gasket and the ends of the pipe. These members have shallow internal annular recesses. The gasket has diametrically opposed extending ears which are clamped between mating end parts forming lugs on the clamping members. The gasket has an integral external annular rib which fits into the annular recesses in the clamping members; pipes with spigot beads are accommodated in the annular recesses of the clamping members. The clamping members when clamped (torqued) deform to apply clamping pressure to the gasket throughout the entire circumference.

11 Claims, 7 Drawing Figures

PIPE COUPLING

This is a continuation of application Ser. No. 512,958 filed on Oct. 7, 1974.

BACKGROUND OF THE INVENTION

1. Field of the Invention

The field of the invention is that of pipe couplings. The invention is particularly adapted for coupling soil pipes but not limited thereto. For example, plastic pipe as well as clay can readily be joined by the coupling.

2. Description of the Prior Art

The invention is an improvement over Pat. No. 3,479,066 and all prior art cited therein. In the said patent, the clamping members are rigid, being of cast iron. Rigid members are typical of the prior art. Clamping members that are readily flexible or bendable are also known in the prior art. The prior art has left room for improvement in respect of economy of manufacture and the capability of effectively accommodating to the sealing in a coupling of pipe ends in a wider range of variation in tolerances of outer diameters of the pipes.

SUMMARY OF THE INVENTION

This invention relates to an improved coupling means adapted to couple the ends of pipes together in fluid tight relationship. The coupling of the invention is adapted for coupling together the ends of pipes that either have or do not have external annular end ribs, known as spigot beads. The coupling of the invention is a versatile one capable or providing a firm, rigid, and positive coupling between either of these types of pipe ends or furthermore, it can provide a similar sealing coupling between the end of a pipe having a spigot bead and the end of another pipe not having a spigot bead. The coupling is adapted for use with pipes of uniform diameter throughout or with pipe sections having enlarged or belled end parts. The invention is particularly adapted to, but not limited to use with soil pipes. In a preferred form of the invention, the coupling embodies clamping members which clamp around the ends of the pipes to be joined. A circular gasket is provided which surrounds the ends of the pipes being joined within the clamping means. The clamping means is formed of generally semicircular members having a shallow internal annular groove into which the gasket can deform. The gasket has diametrically opposed extending ears which are clamped between end parts of the clamping members to compensate for dimensional variations in the clamping members and/or the pipe ends and participate in sealing the joint. The end parts include radially extending lug surfaces. The gasket has internal annular ribs including a central rib which fits between abutting ends of the pipe section being joined, and internal annular ribs which are forced against the pipe surfaces. The gasket preferably also has external annular ribs. In the preferred form of the invention the gasket is provided with an integral, external, relatively wide rib, as described in detail hereinafter.

It is a primary object of the invention to provide a simplified and positive acting pipe coupling having the necessary versatility to serve the purposes set forth above.

It is a further object of the invention to provide such a pipe coupling which provides a firm, rigid joint in circumstances wherein the pipe ends do not have end spigot beads; where they do have end spigot beads; or where one pipe end has a spigot bead and the other does not.

A further object is to compensate for dimensional variations in the clamping members or pipe ends by means of the configurations of the clamping members and the ears on the gasket and the deformability of the clamping members.

Further objects and additional advantages of the invention will become apparent from the following detailed description and annexed drawings wherein.

Figure 1:
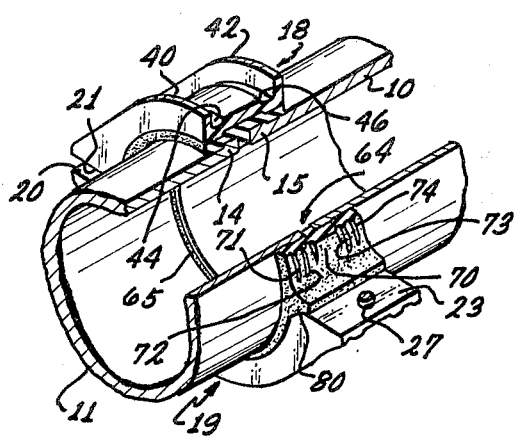
FIG. 1 is an isometric view of a preferred from of the invention.
Figure 2:
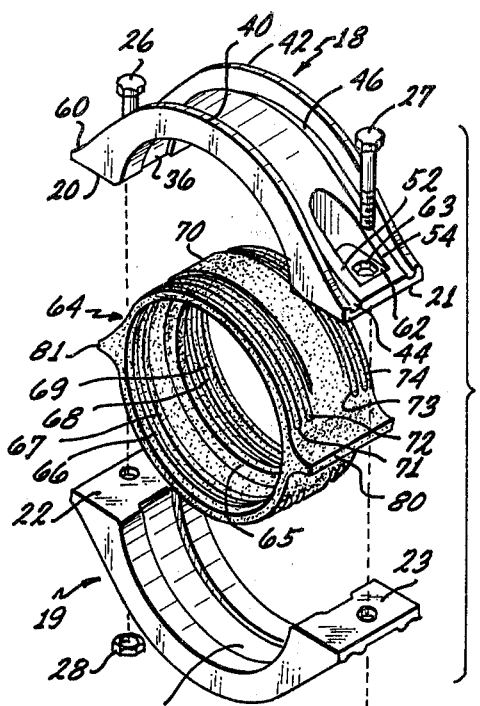
FIG. 2 is an exploded isometric view of the clamps and the gasket.

Referring now more particularly to FIGS. 1 and 2 of the drawings, a preferred from of the the pipe coupling of the invention is shown in this figure. Numerals 10 and 11 designate ends of pipe or conduit sections. These pipe sections are of the type that have spigot beads at the ends (i.e.), annular end ribs as shown at 14 and 15 (see FIG. 4). The nature of the pipe coupling of the invention is such that it is capable of providing a rigid, effective seal whether or not the external annular end ribs are present. The coupling comprises semi-circular clamping members 18 and 19 which have end parts providing flat generally radial surfaces 20 and 21 and 22 and 23 as shown, which are adpated to be secured together by bolts 26 and 27 and nuts 28 and 29. The end parts have openings as shown and they are secured together by the bolts.

Each of the clamping members 18 and 19 has a shallow internal annular recess as designated at 36 and 38.

The clamping members are not cast iron, but are preferably made of a plastic material, but could be made of other materials. The inside configuration of the clamping members is shown in FIGS. 1 and 2.

Figure 4:
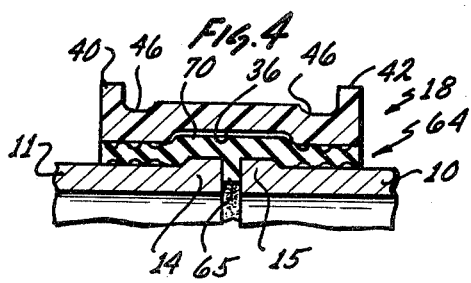
FIGS. 4, 5 and 6 are sectional views of the coupling and gasket showing coupling pipe ends, both having spigot beads; one having a spigot bead; and neither having spigot beads, respectively.

The outside configuration of the clamping members is shown in FIGS. 1 and 2 and 4–6. At the sides of clamp 18 are annular ribs 40 and 42 and just inside of these ribs are annular grooves 44 and 46. The end parts of the coupling members which provide lugs are configurated to have an increasing dimension in a radial direction, as shown. FIG. 4 shows a cross-section of clamping member 18. The end parts 20, 21, 22 and 23 are designed to accommodate the clamping bolts and nuts and to have the necessary strength. Referring to part 21 it will be observed that it has greater radial extent than the radial dimension at ribs 40 and 42. Ribs 40 and 42 increase in radial dimension at the end. At the ends, the surfaces on the inside of grooves 44 and 46 are raised to form ribs 52 and 54. The construction as just described provides appropriate strength for clamping the end parts of the clamping members against the gasket as will be described. With this construction of the clamping member, appropriate strength and flexibility are realized with a minimum section thickness thereby minimizing the amount of material used.

The hole for bolt 27 has a hexagonal counterbore 63 to retain the hexagonal bolt head against rotation while torquing. The configuration is the same at the other end of the clamp 18. Nut 29 fits against a flat on the end of clamp 19 opposite flat 23.

In this plastic coupling, when the clamps are drawn together, that is, torqued, only 60 inch pounds of torque are required, whereas with the cast iron coupling 175 inch pounds were required. In the plastic coupling when the coupling halves are drawn together the clamp flexes and this can be discerned by simply flexing one of the clamps by hand, the result being that the entire surface of the clamp flexes or deforms so as to contour the gasket through 360 degrees, aiding in the sealing at lower torques. Of course, a cast iron coupling does not flex or deform in this manner.

The coupling is easier to produce because it can be produced by plastic injection molding. It is much cheaper, also. The plastic clamping members are designed so as to be strong enough that they can actually clamp a gasket against the ends of cast iron soil pipes, while at the same time the clamping members are sufficiently flexible so that they can flex and deform in the manner described above when torqued at a relatively low amount of inch pounds to clamp and seal entirely around the gasket. In view of all this, smaller sized fastening members are used as compared to cast iron clamps.

The cross-sectional configuration of each clamp is designed to provide the necessary strength while at the same time having the desired flexibility or deformability characteristic. The ribs and annular grooves contribute to this characteristic.

The preferred plastic used is type known as ABS or PVC, but different kinds can be used. The thickness of the clamping members considered with the ribbing and the annular grooves is designed so that with the minimum material it has the proper strength and also the proper degree of flexibility to contour adequately around the gasket so that adequate joint sealing and protection are provided. The ABS material is acrylonitrile-butadiene-styrene; PVC is polyvinyl chloride. However, most plastic materials such as nylon, acrylic, acetal, epoxy, cellulosics, melamine, phenolic, polyesters, polystyrene can be used. The advantages of plastic material include (1) desirable deformation which contours the clamping members around the gasket and consequently is more adaptable to sealing the joint; (2) because of the improved deformation capability, pipes with wider outer diameter tolerance can be successfully sealed.

Numeral 64 designates a circular gasket member which may be made of any suitable elastomeric sealing material, such as Neoprene. The gasket is relatively thin in section. It has an integral internal intermediate annular rib 65. It also has internal annular sealing ribs spaced outwardly from the central rib 65, as designated at 66 and 67 adjacent one end and at 68 and 69 adjacent the opposite end. The gasket has a wider circumferential external annular rib as designated at 70. It has external annular sealing ribs as designated at 71 and 72 at one end spaced from the rib 70 and external ribs 73 and 74 at the other end.

The gasket has diametrically opposed ears 80 and 81. The lugs (end parts) or surfaces 20-23 are secured together clamping the gasket ears 80 and 81 between them as shown, the lugs being securable together by the bolts as shown. The extended ears 80 and 81 have concavely curved exterior contours as shown. The end parts or lugs on the clamping members 18 and 19 are similarly contoured on the inside so as to be complementary to the exterior contour of the ears 80 and 81. Thus, when the clamping members are drawn together, the ears can be compressed and in this manner compensation or accommodation is provided for dimensional variations in the pipe ends or in the clamps, while radial compression seals the joint. The arc or curvature of the complementary surface on the ears and on the clamps as shown is exemplary. The radius of curvature can be less than that shown or greater and in fact the contour can be a line tangent to the gasket circumference. It is significant that the clamp ends are held apart by the ears allowing clamping sufficiently to compensate for tolerances in diameters of pipe ends being clamped. Thus, the clamping force on the bolts is primarily exerted against the circumferential sealing ribs (external and internal) and the ears, finally extending the pressure against the remaining gasket surface. This capability is enhanced by the ability of the clamp members to deform and properly contour against the outside gasket surface.

FIG. 1 shows the pipe coupling in clamped position without substantial torquing. The internal rib 65 on the gasket 64 fits in between the abutting ends of the pipe sections 10 and 11. The clamping members 18 and 19 are drawn together, and firmly clamped and deform the gasket 64 against the outer surfaces of the pipe ends 10 and 11. As will be observed, the presence of the spigot beads or external annular ribs 14 and 15 (FIG. 4) causes the intermediate part of the gasket 65 to be deformed into or towards the annular recesses 36 and 38 in the clamping members 18 and 19. The inner parts of the clamping members 18 and 19 deform the gasket 65 against the outer surfaces while the pipe ends 10 and 11 cause deformation of the sealing ribs 66–69 and 71–74, so that a firm, effective seal is formed between the clamping means and the pipe ends over substantial axial length of the pipe ends. It should be noted that with larger diameter pipe ends, the presence of spigot beads will tend to push the gasket more into the lateral and available space in the clamping recesses. Furthermore, the joint formed by the coupling is extremely secure and strong. FIGS. 1 and 4–6 show a condition before substantial torquing of the clamps has been done, the gasket not being fully compressed.

FIG. 4 is a cross-sectional view through a part of the coupling of FIGS. 1 and 2. This shows use of the invention with pipe ends both of which have spigot beads, that is, end ribs as shown at 14 and 15. The external rib 70 fits into the recesses 36–38 in the clamping members as shown and this part of the gasket is compressed in the space between the clamping members and the pipe ends as shown. Sealing is effected by the internal and external annular sealing ribs, and the radial compression exerted on the ears 80–81 by the clamping members. The position of the annular rib 70 in the recesses in the clamping member positions the gasket and helps prevent the pipe ends having spigot beads from pulling out of the coupling. Slight spaces appear at the sides of the recesses to accommodate compressed gasket material.

The contact pressure between the inside of the clamping members and the outside surface of gasket 70 will vary depending upon the diameter of the pipe, the presence or absence of spigot beads, the transmitted torque, etc. Nevertheless, substantial contact exists in the recess so that this area substantially contributes to the joint support.

Figure 5:
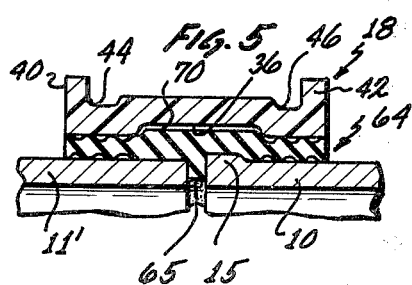
Figure 3:
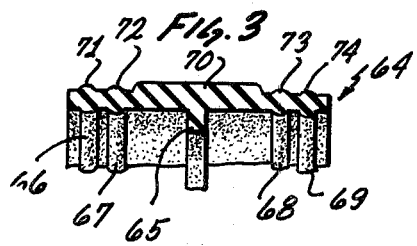
FIG. 3 is a sectional view of the gasket of FIGS. 1 and 2.

FIG. 5 shows the invention adapted for coupling pipe ends as shown at 10 and 11 where only one has an end rib or spigot bead. The rib 70 fits into the annular recess 36 as before. The part of the gasket opposite the spigot bead 15 is compressed as shown. The rib 70 serves to occupy the space between the clamping member 18 and the end of the pipe 11 on the other side of the internal rib 65.

Figure 6:
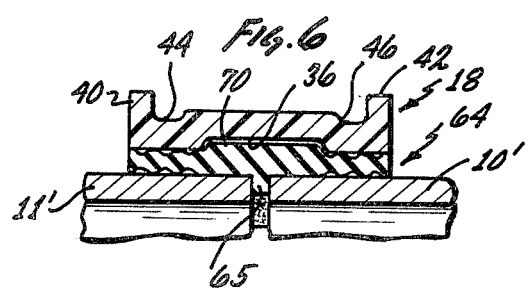

FIG. 6 is a sectional view showing the invention utilized in a coupling where neither of the pipe ends 10' or 11' has an end rib or spigot bead. As will be seen, the rib 70 substantially occupies the annular recess 36 in the clamping member. The space that would otherwise be occupied by spigot beads or end ribs is occupied by the gasket.

Figure 7:
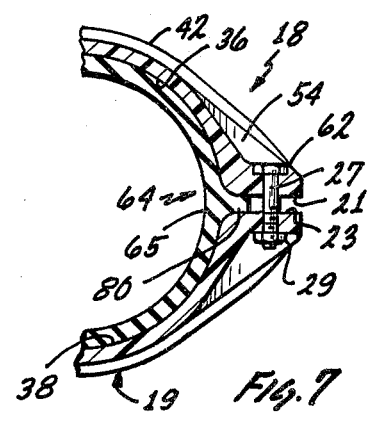
FIG. 7 is a sectional view of the clamp and gasket.

FIG. 7 is a sectional view showing the clamp and gasket of the invention. The ear 80 of the gasket is clamped between the lugs (end parts) or surface 21, 23. The lugs are secured by means of a nut and bolt arrangement as shown.

The external and internal annular ribs serve to secure the sealing effect of the coupling when the clamping members are drawn together as described, during which time radial compression is also exerted on the ears that completes the seal while different pipe outside diameters are appropriately accommodated.

In this joint, the gasket 64 deforms as described. The seal is strong, positive and effective, the parts accommodating themselves to the difference in the parts being coupled. This type of joint provides good support to the cast iron hubless sanitary system piping installations.

From the foregoing, those skilled in the art will observe that the invention as described herein achieves and realizes all of the objects and advantages as set forth in the foregoing. An effective seal and joint is provided by the coupling which is strong and rigid. The coupling is extremely versatile in its ability to fully adapt itself to the coupling of pipe ends with or without spigot beads, or coupling a pipe end with a spigot bead to a pipe end without a spigot bead. The plastic coupling is particularly advantageous in contouring about the pipe diameters over 360° and can accommodate pipe with wider ranges of diameter tolerances.

The foregoing disclosure is representative of a preferred form of the invention and is to be interpreted in an illustrative rather than in a limiting sense, the invention to be accorded the full scope of the claims appended hereto.

What is claimed is:

1. In a pipe coupling for coupling the ends of pipes or conduits in fluid tight relationship adapted for pipes either with or without external annular end ribs comprising in combination, generally circular clamping means configured for clamping around the pipe ends, said clamping means embodying a pair of substantially semi-circular clamping members constructed to be clamped together and bolt means to draw the ends of the said clamping members towards each other, circular gasket means adapted to be interposed between the clamping means and the pipe ends being coupled and spanning the ends of the pipe, the said clamping members being constructed to clamp the gasket means against the pipe ends, the gasket means having diametrically opposed, outwardly-extending radial ears, the clamping members having end parts with the said ears clamped there between, the clamping members being held in spaced relationship by the ears, the improvement comprising said clamping means being constructed of plastic material, each of said clamping members having external annular radially extending side ribs and each having external annular grooves formed in it adjacent to and co-extensive with the annular ribs, the said annular ribs extending to the ends of the said end parts of each clamping member, additional external, radially extending ribs formed on each of said end parts on the inside of the said grooves to provide the necessary strength to said clamping members while each clamping member having sufficient deformability to deform against the gasket when the a clamping members are clamped together, the said plastic material having sufficient deformability whereby in response to clamping force drawing said clamping members toward each other, the said clamping members deform in contour whereby to exert a substantially radially inward clamping force against the gasket through substantially 360° thereby having the capability of accommodating greater variations in dimensional tolerance of pipe diameters and of coupling rigid pipe ends with said bolt means torqued within the stress limitations of said material.

2. A pipe coupling as in claim 1 wherein the clamping members each have a shallow internal annular recess and the said gasket has an external rib configurated to fit into the recesses in the clamping members, for accommodating pipes with or without spigot beads.

3. A pipe coupling as in claim 1 wherein the gasket has internal annular end ribs adjacent the ends of the gasket whereby upon clamping, the ends of the gasket deform into sealing engagement with the pipe ends.

4. A pipe coupling as in claim 3 wherein the gasket has external end ribs opposite the internal annular end ribs.

5. A pipe coupling as in claim 1 wherein the said ears on the gasket have an exterior contour including the outer gasket surface having gradually increasing radial dimension from the surface of the gasket to the extremities of the ears, the said clamping members having mating complementary contoured portions at the end parts whereby compression of the gasket and the ears exerts inward forces on the said gasket means to accommodate for dimensional variations in the pipe ends and clamping means.

6. A pipe coupling as in claim 1 wherein each of said clamping members has recesses formed in it at its ends between the said additional ribs, each of said recesses having a flat bottom surface providing for means adapted for securing end parts of opposed clamping members together.

7. A pipe coupling as in claim 6, said last means including bores in each of said end parts for receiving bolts, each of said flat bottom surfaces having a hexagonal counter-bore at the end of a bolt-receiving bore to receive the hexagonal head of a clamping bolt.

8. A pipe coupling as in claim 1 wherein the gasket has pairs of external ribs at each end extending over the exterior of the gasket substantially to the extending ears.

9. In a pipe coupling for coupling the ends of pipes or conduits in fluid tight relationship adapted for pipes either with or without external annular end ribs comprising in combination, generally circular clamping means configured for clamping around the pipe ends, said clamping means embodying a pair of substantially semi-circular clamping members constructed to be clamped together and bolt means to draw the ends of said clamping members toward each other, circular gasket means adapted to be interposed between the clamping means and the pipe ends being coupled and spanning the ends of the pipe, the said clamping members being constructed to clamp the gasket means against the pipe ends, the gasket means having diametrically-opposed, outwardly extending radial ears and annular ribs, the clamping members having end parts with the said ears clamped therebetween the clamping members being held in spaced relationship by the ears, the improvement comprising the said ears on the gasket having an exterior contour including the outer gasket surface having gradually increasing radial dimension from the surface of the gasket to the extremities of the ears, the said clamping members having mating complementary contoured portions at the end parts whereby compression of the gasket and the ears exerts inward forces on the said gasket means, said clamping means being constructed of plastic material, each of said clamping members having external annular radially extending side ribs and each having external annular grooves formed in it adjacent to and co-extensive with the annular ribs, the said annular ribs extending to the ends of the said end parts of each clamping member, additional external radially extending ribs formed in each of said end parts on the inside of the said grooves to provide the necessary strength to said clamping members while each clamping member having sufficient deformability to deform against the gasket when the clamping members are clamped together, the said plastic material having sufficient deformability whereby in response to a clamping force drawing said clamping members toward each other, compression of the curved outer ear surfaces by the clamping mating parts generates vector forces, the addition of which produces a resultant force, the compression-deflection relationship controlling the contouring is such that the resultant overall force is directed inwardly so that the thickened inner surface of the gasket ears and the sealing ribs are compressed against the pipe, establishing a fluid tight seal in the area, the improved contact between the plastic clamping members and the gasket enhancing the sealing of the entire gasket surface areas and pipe, so that larger diameter tolerances can be accommodated.

10. In a pipe coupling for coupling the ends of pipes or conduits in fluid tight relationship adapted for pipes either with or without external annular end ribs comprising in combinations, generally circular clamping means configurated for clamping around the pipe ends, said clamping means embodying a pair of substantially semi-circular clamping members constructed to be clamped together and bolt means to draw the ends of said clamping members towards each other, circular gasket means made of deformable but noncompressible material interposed between the clamping means and the pipe ends being coupled and spanning the ends of the pipe ends being coupled, the gasket means having diametrically opposed outwardly extending radial ears, the clamping members having radially extending end parts with the said ears clamped there-between, the clamping members being held in spaced relationship by the ears, the improvement comprising the said ears on the gasket having an exterior contour including the outer gasket surface having gradually increasing radial dimension from the surface of the gasket to the extremities of the ears, the said clamping members having mating complementary contoured portions at the end parts whereby compression of the gasket means and the ears exerts inward forces on the said gasket means, said clamping means being constructed of plastic material, the bolt means providing means to draw the said end parts of the clamping members toward each other, the said end parts squeezing the ears depending on the tightening of the bolt means whereby in response to clamping force drawing said clamping members towards each other, the said clamping members deform in contour producing vectorial forces having a resultant whereby to exert a substantially radially inward clamping force against the gasket means throughout substantially 360°, the clamping members and gasket means being constructed to have surface to surface contact throughout between the entire inside surfaces of the clamping members and the outside surfaces of the gasket means, surfaces of the gasket means having annular ribs, the material in the gasket means having the capability of deforming without compressing, the mating surfaces of the clamping members means and said gasket means being constructed so that the said inward clamping force causes the thickened inner parts of the ears and the annular ribs to deform (flow) and be pressed into fluid-tight sealing relationship between the said surfaces and wherein each of said clamping members has external annular radially extending side ribs and each having external annular grooves formed in it adjacent to and co-extensive with the annular ribs, the said annular ribs extending to the ends of the said end parts of each clamping member, additional external radially extending ribs of the inside of the said grooves to provide the necessary strength while each clamping member having sufficient deformability to deform against the gasket means when the clamping members are clamped together.

11. A pipe coupling as in claim 10, wherein said annular ribs are both on outside surfaces and inside surfaces thereof.

* * * * *